United States Patent
Concha et al.

(10) Patent No.: US 7,389,648 B2
(45) Date of Patent: Jun. 24, 2008

(54) PRESSURE REGULATION IN A TRANSCRITICAL REFRIGERANT CYCLE

(75) Inventors: Julio Concha, Rocky Hill, CT (US); Tobias H. Sienel, Manchester, CT (US); Bryan A. Eisenhower, East Hartford, CT (US); Yu Chen, East Hartford, CT (US); Young K. Park, Simsbury, CT (US)

(73) Assignee: Carrier Corporation, Syracuse, NY (US)

( * ) Notice: Subject to any disclaimer, the term of this patent is extended or adjusted under 35 U.S.C. 154(b) by 682 days.

(21) Appl. No.: 10/793,489

(22) Filed: Mar. 4, 2004

(65) Prior Publication Data

US 2005/0193753 A1 Sep. 8, 2005

(51) Int. Cl.
*F25B 41/04* (2006.01)
*F25B 41/00* (2006.01)

(52) U.S. Cl. ............................ 62/223; 62/210; 62/211

(58) Field of Classification Search .............. 62/183, 62/181, 180, 127, 238.6, 238.7, 223, 210, 62/211; 236/21 B, 20 R, 25 R; 237/2 R, 237/2 B See application file for complete search history.

(56) References Cited

U.S. PATENT DOCUMENTS

| 5,568,377 | A | 10/1996 | Seem |
| 5,735,134 | A | 4/1998 | Liu |
| 6,253,113 | B1 | 6/2001 | Lu |
| 6,264,111 | B1 | 7/2001 | Nicolson |
| 6,370,896 | B1 * | 4/2002 | Sakakibara et al. ........... 62/201 |
| 6,467,288 | B2 * | 10/2002 | Kuroki et al. ................. 62/197 |
| 6,467,289 | B2 * | 10/2002 | Kuroki et al. ................. 62/201 |

* cited by examiner

*Primary Examiner*—Chen-Wen Jiang
(74) *Attorney, Agent, or Firm*—Carlson, Gaskey & Olds

(57) ABSTRACT

A refrigerant cycle is provided with a control for an expansion device to achieve a desired compressor discharge pressure. The system operates transcritically, such that greater freedom over compressor discharge pressure is provided. The system's efficiency is optimized by selecting an optimum discharge pressure. The optimum discharge pressure is selected based upon sensed environmental conditions, and the expansion device is adjusted to achieve the desired compressor discharge pressure. A feedback loop may be provided to sense the actual compressor discharge pressure and adjust the actual compressor discharge pressure by further refining the expansion device. The system is disclosed providing heated water based upon a demand for a particular hot water temperature. Further, the optimum discharge pressures may be determined experimentally, with an offset added to the experimentally determined value to ensure that the actual pressure is higher than the desired, or optimum pressure for the particular refrigerant cycle. In one embodiment, a formula is utilized to determine the optimum discharge pressure.

15 Claims, 1 Drawing Sheet

PRESSURE REGULATION IN A TRANSCRITICAL REFRIGERANT CYCLE

BACKGROUND OF THE INVENTION

This application relates to a refrigerant cycle that operates in a transcritical mode, such that there is freedom in the selection of discharge pressure. An optimum discharge pressure is identified based upon system conditions to maximize efficiency.

Refrigerant cycles are utilized to provide heating or cooling in a variety of applications. Generally, a compressor compresses a refrigerant and delivers that refrigerant to a first heat exchanger, at which heat is given off to another fluid. From this first heat exchanger, the refrigerant passes to an expansion device that expands the refrigerant. The refrigerant then passes to a second heat exchanger, where the refrigerant takes in heat from another fluid. The two heat exchangers often include one indoors and one outdoors. The refrigerant cycle is used to provide heating or cooling for a fluid at one of the heat exchangers.

While refrigerant cycles are often utilized to provide heating, ventilation or air conditioning (HVAC), there are other applications. In one non-HVAC application, a refrigerant cycle is utilized to heat hot water for sanitary water uses, such as a faucet, shower, etc. The present invention extends to both HVAC applications and other non-HVAC applications.

In one modern refrigerant system, the refrigerant moves above the critical point of a pressure enthalpy curve. Once above this point, the refrigerant cycle designer has more control over refrigerant operating pressures. In a standard cycle, there is less control over pressures, and a system design typically dictates operational pressure.

Various refrigerant cycles control pressure in transcritical systems. However, these controls have typically been for safety, such as to prevent over-pressurization. The prior art does not achieve the most efficient operation based upon this control.

SUMMARY OF THE INVENTION

In a disclosed embodiment of this invention, a number of environmental conditions are associated with optimum compressor discharge pressures. Thus, a number of sensors sense environmental conditions, and a control determines an optimum compressor discharge pressure based upon those conditions. The optimum pressure is then achieved by regulating the expansion valve to result in the optimum discharge pressure.

In a preferred embodiment, the environmental conditions include a demand upon the refrigerant cycle, and the ambient temperature. Further, the amount of charge in the refrigerant cycle is known, but may be a further variable affecting the desired discharge pressure.

In a most preferred environment, the present invention is utilized to provide heated water. A user requests a particular water temperature. Among the environmental conditions being sensed with this embodiment is the cool water temperature, demanded hot water temperature, and the ambient temperature.

Optimum compressor discharge pressures are developed based upon the combination of environmental conditions. These optimum discharge pressures were initially determined experimentally to provide the most efficient operation, or maximum co-efficient of performance (COP).

While the control can operate solely from a look-up table to determine optimum discharge pressure, a formula for identifying an optimum pressure is disclosed. A control, which is preferably a microprocessor, determines a desired compressor discharge pressure based upon the several environmental conditions. The microprocessor controls an expansion device in the refrigerant cycle to achieve the desired compressor discharge pressure. The compressor discharge pressure is sensed, and the expansion device is adjusted to adjust the actual compressor discharge pressure to meet the desired compressor discharge pressure. That is, a feedback loop is preferably incorporated into the control.

A small offset is preferably added to the desired or calculated discharge pressure to get to a final demanded, or set point, pressure. This small offset is added to the calculated discharge pressure to ensure that heat variation in the particular refrigerant system does not result in the actual pressure being lower than the previously calculated pressure. It is more desirable to have the actual pressure be above the calculated optimum pressure for the particular system, than to have it be below. Thus, by utilizing this small offset, the present invention ensures that the actual operating pressure will always be targeted to be equal to, or higher, than the calculated optimum design pressure for the particular refrigerant cycle.

These and other features of the present invention can be best understood from the following specification and drawings, the following of which is a brief description.

DETAILED DESCRIPTION OF THE PREFERRED EMBODIMENT

Figure 1:
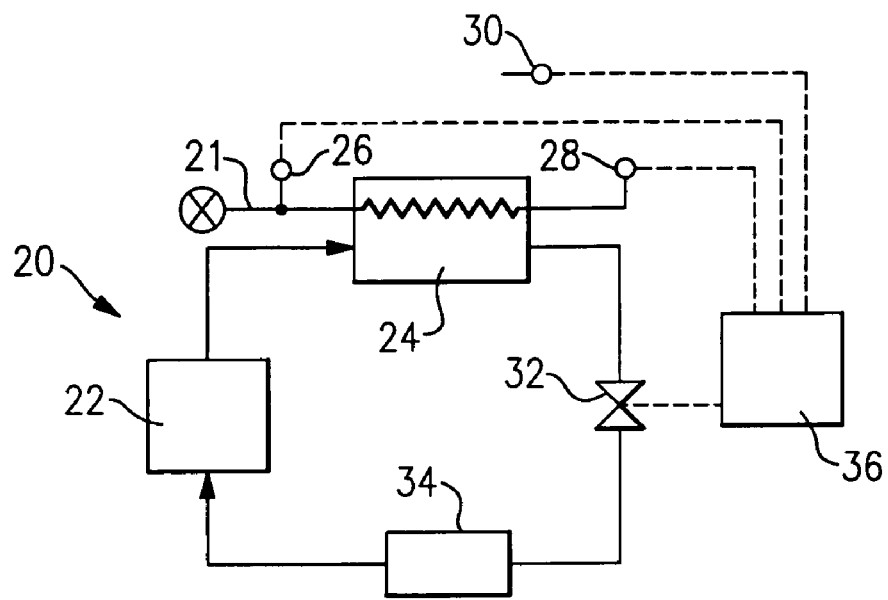
FIG. 1 is a schematic view of a refrigerant cycle incorporating the present invention.

FIG. 1 shows a refrigerant cycle 20 incorporating a compressor 22 delivering a compressed refrigerant to a first heat exchanger 24. The heat exchanger 24 is preferably part of a hot water supply system 21, and the refrigerant cycle is directed to heating water based upon a demand signal as shown by an input 28. Some demand signal, such as a user adjusting a mixing faucet, provides a desired hot water outlet temperature. Another sensor is associated with a cool water supply to sense entering water temperature at 26. The water supply supplies cool water to the heat exchanger 24 to be heated. Sensor 30 provides an ambient temperature signal 27. The signals from sensor 26, 28 and 30 are all supplied to a control 36 for an expansion device 32. The expansion device 32 is an adjustable expansion device, having an orifice that may be open or closed to change refrigerant conditions within the refrigerant cycle. In particular, such adjustable expansion devices are known for achieving a desired discharge pressure in the system. The refrigerant from the heat exchanger 24 passes to the expansion device 32, and then to another heat exchanger 34. From the heat exchanger 34, the refrigerant returns to the compressor 22.

The present invention will be described with reference to the flowchart of FIG. 2. Upon identifying a set of system variables, or environmental conditions, from the sensors 26, 28 and 30, and perhaps by knowing the charge of refrigerant in the cycle 20 (a given typically), the control is able to identify a desired compressor outlet pressure. This compressor outlet pressure can be determined experimentally with regard to the given system design to achieve optimum efficiency. Other goals beyond efficiency may enter into selecting a desired discharge pressure. A worker of ordinary skill in the art would recognize the various factors that would define what could be an "optimum" pressure.

While the optimum discharge pressure is determined experimentally, and may be stored in a look-up table, such that the controls can sense the various environmental conditions and select an optimum discharge pressure, applicant has also developed a formula for selecting an optimum pressure. The disclosed formula is:

$$P^* = c(1)*EWT + c(2)*EWT^2 + c(3)*EWT^3 + c(4)*LWT + c(5)*LWT^2 + c(6)*LWT^3 + c(7)*OAT + c(8)*OAT^2 + c(9)*OAT^3 c(10)$$

wherein P* is an optimal operating pressure. P* is determined based upon the EWT, which is the temperature of the cold water entering the pump; the LWT, which is a desired hot water temperature demanded by the user; and an OAT, which is the temperature of ambient air. The constants "c" are developed experimentally. The experiments are utilized to determine the optimum pressure, and in a disclosed embodiment, were developed to maximize the energy efficiency (COP) of the overall system. Thus, the constants will vary with the particular size capacity, etc., of the cycle.

The refrigerant cycle 20 is most preferably one that operates transcritical, or above the liquid-vapor dome. Under such conditions, one is able to vary discharge pressure such that the optimum conditions can be achieved. Most preferably, the transcritical refrigerant cycle is provided by utilizing a particular type of refrigerant. In one common example, the refrigerant may be $CO_2$.

Figure 2:
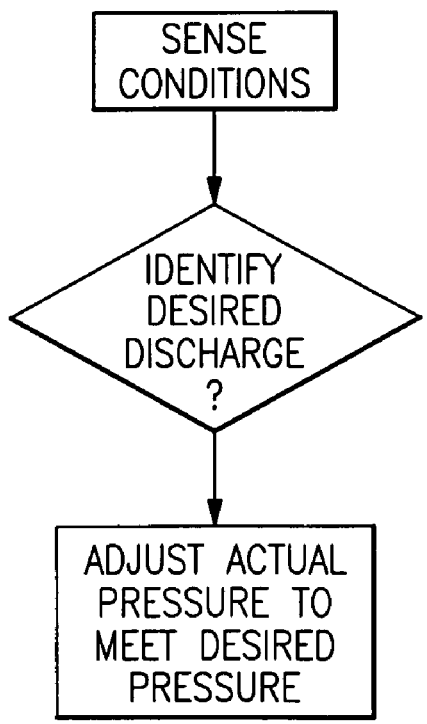
FIG. 2 is a flowchart of the steps involved in the present invention.

As shown in FIG. 2, the several variables are sensed, and the control 36 determines a desired discharge refrigerant pressure based upon the set of variables. The optimum discharge pressure is preferably calculated based upon the above formula.

The invention also adds an offset to the initially determined optimum discharge pressure. The offset ensures that any variations in the refrigerant cycle will not result in the actual pressure being lower than the desired, or calculated pressure for the particular refrigerant cycle. It would be more desirable to have the actual pressure be higher than the determining optimum design pressure, than have it be lower. As such, by adding an offset to the desired pressure, one is more likely to ensure the actual pressure achieved will be equal to or less than what the control 36 has determined would be the optimum discharge pressure.

Among the factors that could result in the actual pressure varying would be manufacturing tolerances among all of the actual components utilized in a particular refrigerant cycle, variations within the environmental conditions, or changes in the refrigerant cycle over time as it ages. The purpose of the offset is to address these factors.

The magnitude of the offset may be from 1% to 10% of the desired discharge pressure (or on the order of 10-200 psig).

The expansion valve 32 is then controlled to control the discharge pressure from the compressor 22. Sensor 37 senses the discharge pressure, and provides feedback to the control 36. The control 36 thus continues to adjust the expansion valve 32 to achieve the desired discharge pressure (plus the offset). Of course, the offset can be built into the look-up table such that adding the offset is not a separate step.

A particular way of incorporating the inventive regulation into a multi-variable control is disclosed in co-pending U.S. patent application Ser. No. 10/793,486, entitled "Multi-Variable Control of Refrigerant Systems" which was filed on even date herewith. Further, a particular non-linear control algorithm which is utilized in a disclosed embodiment is disclosed in co-pending U.S. patent application Ser. No. 10/793,542, entitled "Non-Linear Control Algorithm in Vapor Compression Systems" and filed on even date herewith.

Although a preferred embodiment of this invention has been disclosed, a worker of ordinary skill in this art would recognize that certain modifications would come within the scope of this invention. For that reason, the following claims should be studied to determine the true scope and content of this invention.

What is claimed is:

1. A system comprising:
   a refrigerant cycle having a compressor for delivering a compressed refrigerant to a first heat exchanger, refrigerant from said first heat exchanger passing to an expansion device, and from said expansion device to a second heat exchanger, refrigerant from said second heat exchanger being returned to said compressor;
   a control for said expansion device, said control sensing at least one environmental condition, and identifying a desired refrigerant condition based upon said environmental condition, said control being operable to drive said expansion device to achieve said desired refrigerant condition; and
   an offset being added to said desired refrigerant condition to reach a demanded refrigerant condition.

2. A system as set forth in claim 1, wherein an actual refrigerant condition is sensed, and is provided as feedback to said control to be compared to said identified desired condition.

3. A system as set forth in claim 1, wherein said at least one environmental condition includes a demand temperature, and an ambient temperature.

4. A system as set forth in claim 3, wherein said first heat exchanger is utilized to heat water, and said demand temperature being a desired hot water temperature.

5. A system as set forth in claim 4, wherein said at least one environmental condition further includes a cool water temperature supplied to said first heat exchanger.

6. A system as set forth in claim 5, wherein said desired refrigerant condition is a discharge refrigerant pressure.

7. A system as set forth in claim 1, wherein said offset is between 1% to 10% of said desired refrigerant condition.

8. A system as set forth in claim 1, wherein said refrigerant condition is a discharge refrigerant pressure.

9. A system as set forth in claim 8, wherein said desired discharge pressure is selected based upon a formula.

10. A system as set forth in claim 1, wherein said refrigerant cycle operates transcritically.

11. A system comprising:
    a refrigerant cycle having a compressor for delivering a compressed refrigerant to a first heat exchanger, refrigerant from said first heat exchanger passing to an expansion device, and from said expansion device to a second heat exchanger, refrigerant from said second heat exchanger being returned to said compressor;
    a control for said expansion device, said control sensing at least one environmental condition, and identifying a desired refrigerant condition based upon said environmental condition, said control being operable to drive said expansion device to achieve said desired refrigerant condition;
    said refrigerant condition being a discharge refrigerant pressure;
    said desired discharge pressure being selected based upon a formula; and the formula is:

$$P^* = c(1)*EWT + c(2)*EWT^2 + c(3)*EWT^3 + c(4)*LWT + c(5)*LWT^2 + c(6)*LWT^3 + c(7)*OAT + c(8)*OAT^2 + c(9)*OAT^3 c(10)$$

wherein P* is an optimal operating pressure, EWT is the temperature of the cold water entering the pump, LWT is a desired hot water temperature demanded by the user, and OAT is the temperature of ambient air, and the "c" are constant numbers obtained experimentally.

12. A method of operating a refrigerant cycle comprising the steps of:
   (1) providing a refrigerant cycle including a compressor compressing a refrigerant and supplying said refrigerant to a first heat exchanger, refrigerant from said first heat exchanger being communicated to an expansion device, and from said expansion device to a second heat exchanger;
   (2) sensing at least one environmental condition, and determining a desired refrigerant condition based upon said sensed variables;
   (3) controlling said expansion device to move an actual refrigerant condition to approach said desired refrigerant condition; and
   (4) said desired refrigerant condition is determined experimentally, and an offset is then added to an experimentally desired refrigerant condition to reach a final desired refrigerant condition to be demanded.

13. A method as set forth in claim 12, wherein said first heat exchanger is utilized to heat water, and said at least one environmental condition includes a demand for a desired hot water temperature.

14. A method as set forth in claim 13, wherein another environmental condition variable supplied to said control is a cool water temperature for water that is to be heated.

15. A method as set forth in claim 12, wherein said refrigerant condition is a discharge pressure downstream of said compressor.

* * * * *